United States Patent
Hegemann

[11] Patent Number: 5,981,061
[45] Date of Patent: Nov. 9, 1999

[54] JOINT SEALING TAPE FOR ASPHALTED AREAS AND JOINT SEALING SYSTEMS BASED ON THE SAME

[75] Inventor: Franz Hegemann, Weissach i. Tal, Germany

[73] Assignee: BITUTEC Bitumen-Technik Service und Vertriebsgesellschaft mbH, Weissach i. Tal, Germany

[21] Appl. No.: 09/177,067

[22] Filed: Oct. 22, 1998

[30] Foreign Application Priority Data

Nov. 7, 1997 [DE] Germany ........................ 297 19 780 U

[51] Int. Cl.$^6$ ............................ B65D 65/28; B42D 15/08
[52] U.S. Cl. ............................ 428/343; 524/35; 524/59; 524/68; 428/343; 428/347; 428/356; 428/382; 428/355 R; 428/462; 428/489; 442/150; 442/149
[58] Field of Search ...................... 428/347, 356, 428/382, 355 R, 462, 489; 442/150, 149; 524/68, 59, 35

[56] References Cited

U.S. PATENT DOCUMENTS

| | | | |
|---|---|---|---|
| 4,332,703 | 6/1982 | Lijzenga et al. | 524/68 |
| 4,876,130 | 10/1989 | Vonk et al. | 428/489 |
| 5,189,083 | 2/1993 | Gelles et al. | 524/68 |
| 5,206,068 | 4/1993 | Kalkanoglu | 428/489 |
| 5,214,082 | 5/1993 | Gelles et al. | 524/68 |
| 5,254,385 | 10/1993 | Wilson | 428/76 |
| 5,270,361 | 12/1993 | Duong et al. | 428/489 |
| 5,596,851 | 1/1997 | Ting | 52/211 |
| 5,718,752 | 2/1998 | Kluttz | 524/68 |
| 5,732,520 | 3/1998 | Maietta | 52/483.1 |
| 5,820,958 | 10/1998 | Swallow | 428/42.2 |

FOREIGN PATENT DOCUMENTS

| | | |
|---|---|---|
| 3045738 | 6/1982 | Germany . |
| 3843574 | 3/1990 | Germany . |
| 8914261 | 5/1990 | Germany . |
| 4037013 | 6/1991 | Germany . |
| 9403343 | 6/1994 | Germany . |
| 4403101 | 9/1994 | Germany . |
| 19603896 | 8/1997 | Germany . |

*Primary Examiner*—Marion McCamish
*Assistant Examiner*—Arti R. Singh
*Attorney, Agent, or Firm*—Jordan and Hamburg LLP

[57] ABSTRACT

A joint sealing tape preferably has the following composition in mass %: 35 to 36% of a premix comprising 73 to 75% of a soft grade of bitumen, 18 to 19% rubber and 7 to 8% of comminuted tire rubber; 31 to 32% of a soft grade of bitumen; 19 to 20% ground slate; 11 to 12% cellulose powder; and 2% silicon dioxide.

6 Claims, 4 Drawing Sheets

JOINT SEALING TAPE FOR ASPHALTED AREAS AND JOINT SEALING SYSTEMS BASED ON THE SAME

BACKGROUND OF THE INVENTION

The invention relates to a joint sealing tape for asphalted areas, such as asphalted roads and pathways, comprising a molded mixture of bitumen, fillers and permanently adhesive polymers not including a carrier, i.e., a solvent. In addition, the invention relates to a joint sealing system based on the said joint sealing tape. In contrast to a large group of prior art elastomer sealing tapes, designed as specific, mainly complex sections, in particular used in concrete joints (see DE 89 14 261 U1, for instance), the plasticity and adhesive strength of the bitumen components is exploited in order to allow sealing of irregularly shaped joints.

Based on optimum selection of dimensional stability for transport and storage on the one hand and plasticity and adhesive strength for the actual sealing function on the other, joint sealing tapes of the type described above may eliminate additional expenses for the use of one or two substrate tapes (DE 38 43 574 C2; DE 44 03 101 A1) for layers of different elasticity for adaptation to the joint walls (DE 30 45 738 C1) or for a special coat of adhesive (DE 196 03 896 A1).

The documented state of technology, as shown in FIGS. 3 to 6, in which a sealing tape 5 is inserted vertically into a joint between two asphalt layers 1.1 and 1.2 and is rolled into a mushroom or hat shape 5.1 (FIG. 4), is general knowledge. It is easy to see that the joint width and cross sections of any sealing tape used must be accurately adapted to each other, i.e. over the full length of the joint, a feature which is hard to maintain in the construction industry. Tight sealing, as shown in FIG. 4, can in fact only be randomly achieved when a vertically arranged joint sealing tape accurately fills the joint, projecting from it by approximately 1 cm. When a joint sealing tape is too thick, it cannot be inserted into a joint. When it is too wide, it will project too far over the joint and is not being flattened by rolling but rather "folded over" (both conditions not shown). Finally, FIGS. 5 and 6 show the case of a joint sealing tape 5 which is too narrow, although it is easy to introduce into a joint but does not fill the joint. In winter in particular, cracks 6 occur in a rolled joint in accordance with FIG. 6 on either side of the joint sealing tape 5. In all cases, including the "randomly" sealing tape of FIGS. 3 and 4, the bottom section of the joint sealing tape is superfluous, cannot contribute to its sealing function and should actually be avoided in the interest of saving resources.

Finally, a molded, non-carrier, bitumen-based sealing material is prior art, which may be used as joint sealing tape, predominantly comprising soft bitumen, rubber flakes, stone dust, an oil-type mineral oil fraction and a short-fiber filler, such as cellulose powder (DE 93 13 030 U1). The composition of this sealing material comprises soft and harder grades, with the latter being provided for pre-cast concrete construction and not necessarily suitable for asphalted areas without any additional processing.

SUMMARY OF THE INVENTION

The invention is based on the task of creating a self-adhesive joint sealing tape, which is easy to process, not requiring any additional adhesives and/or solvents and resulting with some certainty in a fully sealed joint.

This task is solved by the joint sealing tape described hereinbelow.

The horizontal joint sealing tape according to the invention eliminates any pre-coating with solvents and eliminates contaminated containers to be disposed of as special waste. The tape, having a low rubber content, is self-adhesive, welding itself smoothly to the asphalt, with brief flame-softening of the existing asphalt edge being of advantage. The plastic substance is not worn away by traffic in the arrangement according to the invention; on the contrary, it is rolled further into the joint. Due to its high total carbon content, the substance will not become brittle.

The surface fabric, in accordance with the preferred embodiment, prevents the substance from being rolled out too much by traffic on hot days.

The total costs of production and application of the joint sealing tape are lower than for products based on the present state of technology.

BRIEF DESCRIPTION OF THE DRAWINGS

The invention is described hereafter by means of embodiments, with the enclosed drawings showing:

FIG. 1: A joint sealing tape according to the invention prior to rolling in

DETAILED DESCRIPTION OF PREFERRED EMBODIMENTS

Figure 1:
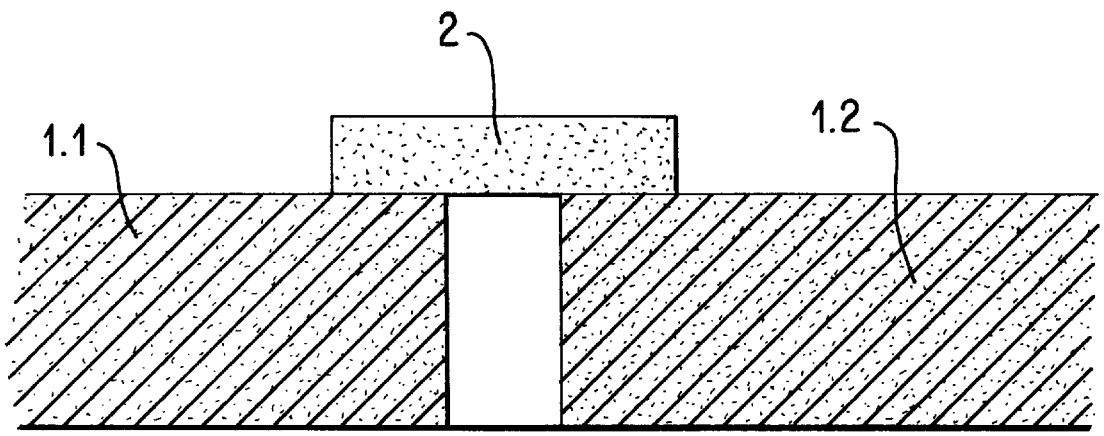
Figure 2:
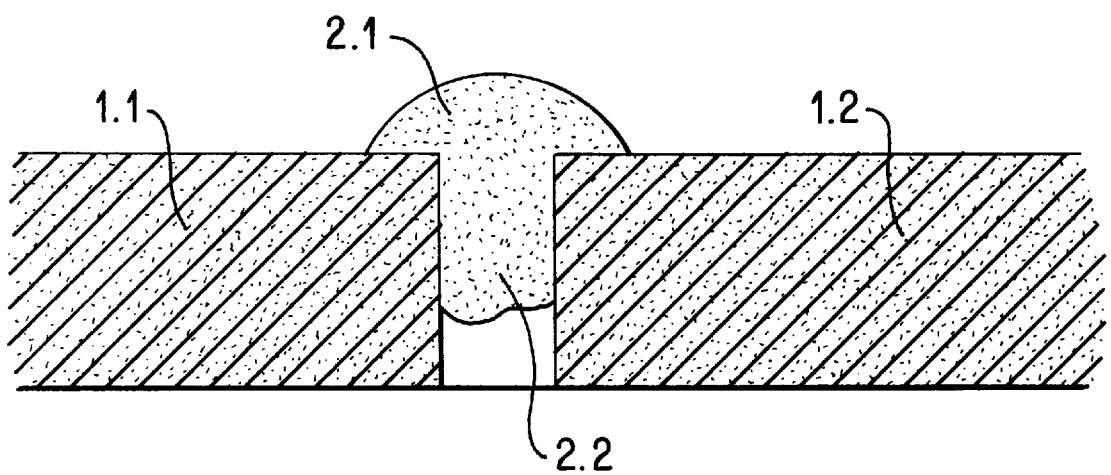
Figure 1A:
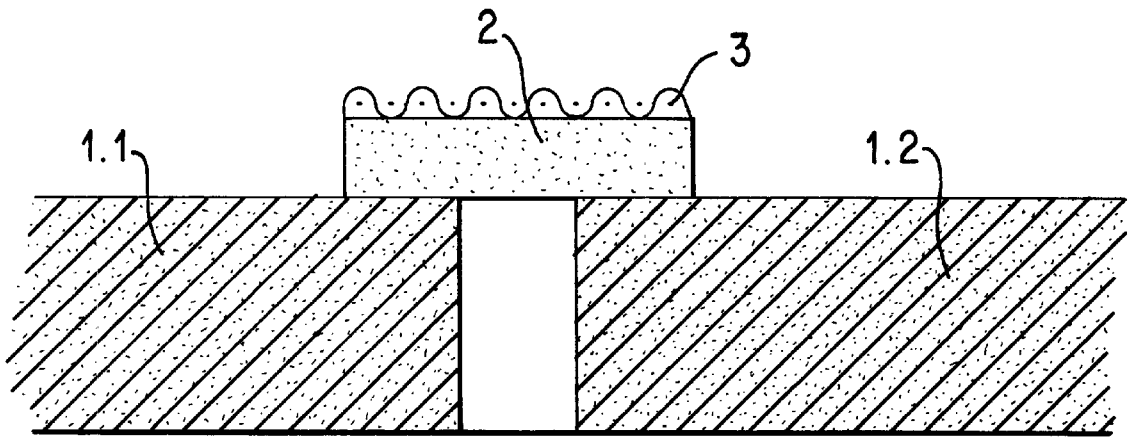
FIG. 1a: A joint sealing tape according to the invention comprising a fabric tape, prior to rolling in FIG. 2: A joint sealing tape according to the invention after rolling in FIG. 2a: A joint sealing tape according to the invention including a sand coating, after rolling in FIG. 3: An "upright" joint sealing tape according to the state of technology, prior to rolling in FIG. 4: An "upright" joint sealing tape according to the state of technology, after rolling in, sealing the joint
Figure 2A:
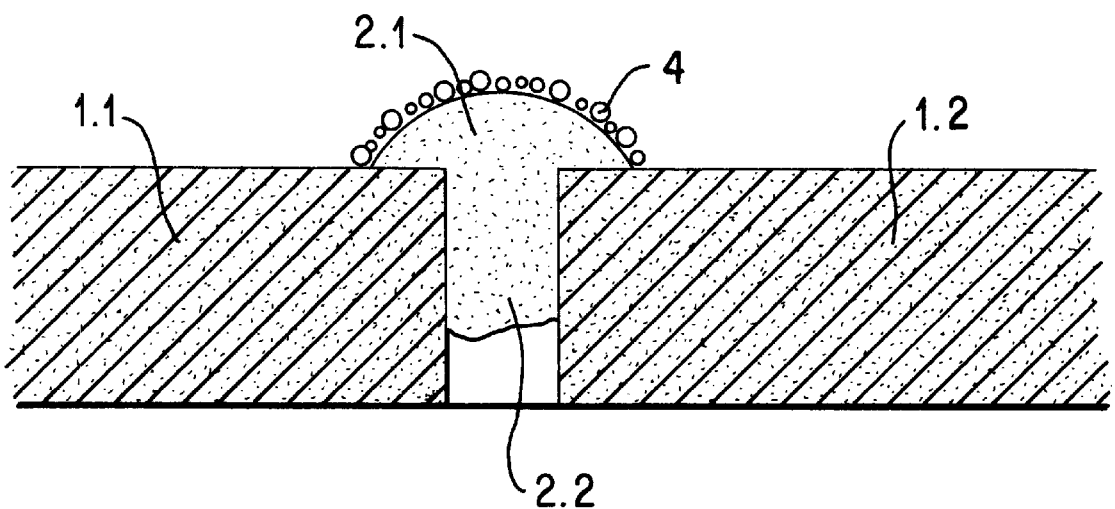
Figure 3:
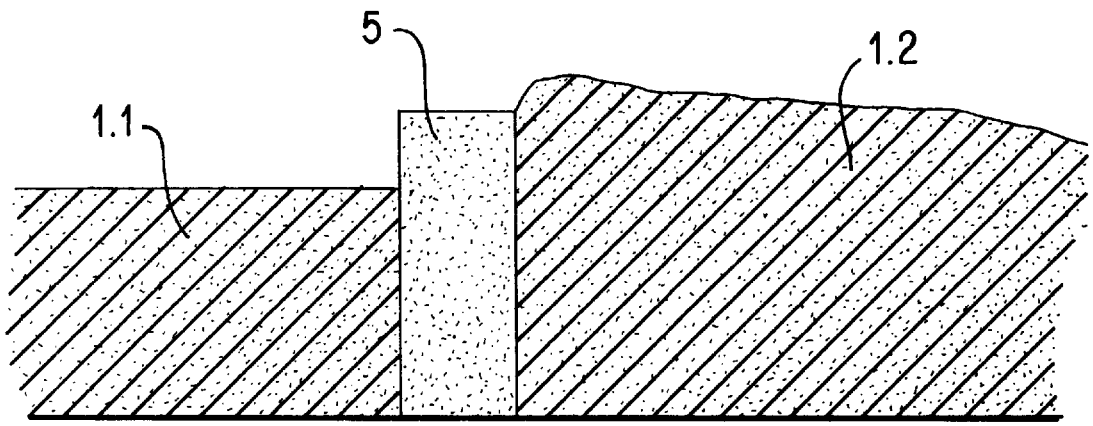
Figure 4:
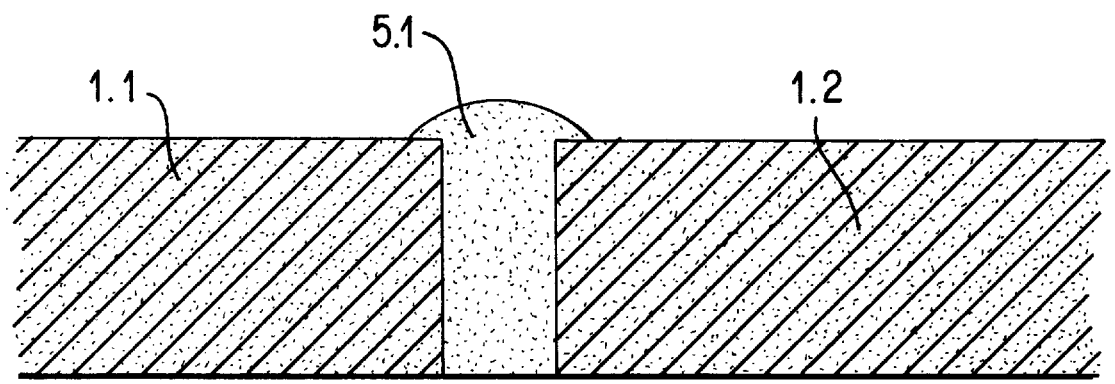
Figure 5:
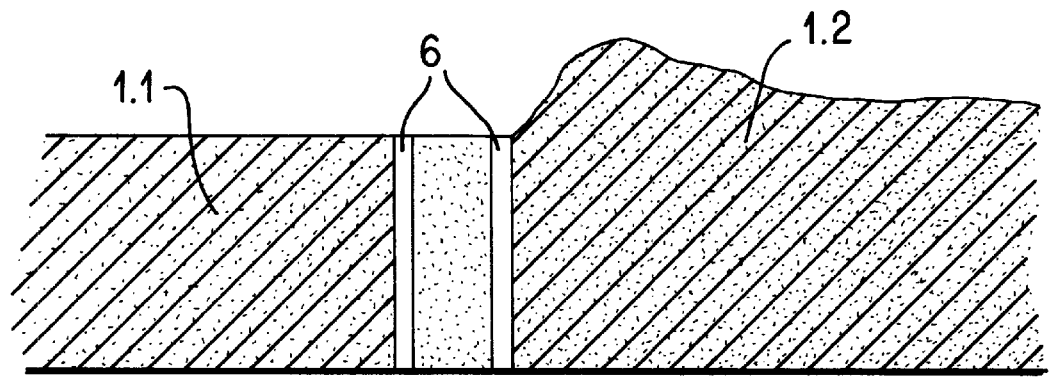
FIG. 5: An "upright" joint sealing tape according to the state of technology, prior to rolling in FIG. 6: An "upright" joint sealing tape according to the state of technology, after rolling in, sealing the joint
Figure 6:
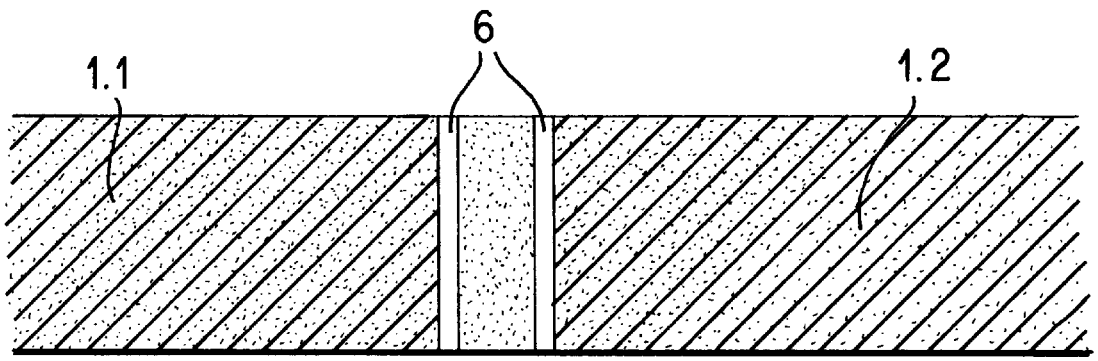

After describing the state of technology above by means of FIGS. 3 to 6, the invention is now mainly described by means of FIGS. 1 and 2 and useful embodiments of the same by means of FIGS. 1a and 2a.

Proven compositions of this joint sealing tape comprises the following:

35.5 (more generally, 35 to 36) mass % of a premix of 75 (more generally, 73 to 75) mass % of a soft grade bitumen, 18.5 (more generally, 18 to 19) mass % of rubber and 7.5 (more generally, 7 to 8) mass % of comminuted recycled tire rubber, additional 32 (more generally, 31 to 32) mass % of a soft grade bitumen, and fillers, namely 19 (more generally, 19 to 20) mass % of ground slate, 11.5 (more generally, 11 to 12) mass % of cellulose powder, and 2 mass % of silicon dioxide powder.

The plasticity of this mix, which is essential to the invention, is tested by positioning a prismatic test specimen having a surface of 50 mm×50 mm and 20 mm height between two parallel metal plates and applying a total load of 6 kp, corresponding to an initial pressure of approximately 22 kPa. The time is measured for reducing the height of specimen to half by plastic deformation. Typical readings of this time are between 15 and 90 minutes, the average being 78 minutes, with a maximum of 180 minutes in order to achieve with some certainty the effects essential to the invention. Expressed as the deformation speed $\epsilon$, as defined in a book by Geleji, "Bildsame Formung der Metalle", Berlin 1967, p. 82, formula (17.3), these readings correspond to typical readings under pressures of $10^{-3}$ s$^{-1}$ to $10^{-4}$ s$^{-1}$ and/or a minimum of $10^{-5}$ s$^{-1}$.

An example of a bitumen is the grade sold by German Shell AG as "200" or "B200". The properties are needle penetration at 25° C. (DIN 52010), in units of ⅒ mm, 160–210, ring and ball softening point (DIN 52011), in ° C., 37–44, breaking point according to Fraass (DIN 52012), in highest ° C., −15° C., ash (DIN 52005), in highest percentage by mass, 0.5%, insoluble in trichloroethylene (DIN 52014), in highest percentage by mass, 0.5%, insoluble in cyclohexane (DIN 52014), in highest percentage by mass, exclusive of ash, 0.5%, paraffin content (DIN 52015), in highest percentage by mass, 2.0%, density at 25° C. (DIN 52004), minimum, in g/cm³, 1.000, flame point C.o.C. (ISO 2592), above 230° C., and changes caused by thermal exposure according to (DIN 52016), namely, relative weight change (DIN 52016), in highest percentage, 1.5%, increase in ring and ball softening point (DIN 52011), in highest ° C., 8.0, and decrease in needle penetration (DIN 52010), in highest percentage, 50%.

Examples of ground slates are those having the following chemical and mineralogical compositions, by weight, such as sold by Vereinigte Thueringische Schiefergruben GmbH. Chemical composition: 58–62% $SiO_2$, 17–23% $Al_2O_3$, 6–8% $Fe_2O_3$, 0.2–0.5% CaO, 1–2% MgO, 0.2–1% $Na_2O$, 2–4% $K_2O$, 0.5–1% $TiO_2$, 0.5–1% $FeS_2$, loss on ignition 4–4.5%. Mineralogical composition: 27–33% quartz, 3–5% feldspars (plagioclase), 37–42% mica (chlorite), 25–27% mica (illite), 0.3–0.6% amorphous carbon, 1–2% miscellaneous.

The cellulose powder and silicon dioxide powder for use in the present invention are not necessarily pure but consist principally of cellulose or silicon dioxide, respectively. Thus, for example, the cellulose powder may be a product sold under the trademark ARBOCEL of J. Rettenmaier & Soehne GmbH & Co., which is technical raw cellulose having a cellulose content of 80%, and the silicon dioxide powder may be diamataceous earth (such as POROSIL MP of Elf Atochem, which has a silicon dioxide content of 75%). The rubber typically comprises a BUNA rubber, namely a synthetic rubber which is a copolymer of butadiene with another monomer, such as BUNA cis 132 of Buna Sow Leuna Olefinverbund GmbH.

In another specimen of the same shape and dimensions, adhesion of the said mass is expressed subject to traction of the same 6 kp in the same test arrangement, by elongation at break from the plate, which should also be a minimum of 50%.

This substance is used for manufacturing non-solvent joint sealing tapes, initially adhesive on either side, of cross sections, depending on the application, of between 15 mm×3 mm to 100 mm×5 mm. These joint sealing tapes 2 are horizontally laid on a joint between two asphalt coats 1.1 and 1.2, as shown in FIG. 1 and either rolled flat by a special roller to a shape 2.1, as shown in FIG. 2, or by passing traffic to a shape shown in FIG. 2*a*, for instance. For rolling by passing traffic, the adhesive characteristics of the top of the joint sealing tape are eliminated, for instance, by a gauze fabric 3 (shown in FIG. 1*a* prior to rolling) or an applied sand or moraine gravel coating 4 (shown in FIG. 2*a* after rolling). FIGS. 2 and 2*a* clearly show the inevitably complete sealing of the joint, saving at the same time material at the bottom of the same which would not improve sealing anyhow.

Processing of the joint sealing tape according to the invention may be effected at outside temperatures of more than 15° C. without any preparation of the joints apart from some cleaning. On the other hand, the edges of the joint may be preheated by means of a flame, prior to applying a horizontal joint sealing tape according to the invention.

What I claim is:

1. A joint sealing tape for asphalted areas, such as asphalted roads and pathways, comprising a non-carrier molded mixture of bitumen, fillers and permanently adhesive polymers, characterized by a combination of the following features:

the extent of the cross section of the joint sealing tape (2) in a direction parallel to the asphalted surface (1.1; 1.2) being larger than in vertical direction to the same, with adhesion being reduced on the exterior of the joint sealing tape facing away from the asphalted surface in comparison with its other external surface;

due to the ratio of the above components of the mix, the deformation speed of a prismatic test specimen, based on an initial pressure of 22 kPa and a plastic height reduction between two parallel plates to 50% of its original height, is set to a level of $10^{-3}$s$^{-1}$ to $10^{-5}$ s$^{-1}$, preferably $10^{-3}$s$^{-1}$ to $10^{-4}$ s$^{-1}$, and based on the ratio of adhesive polymers in the mix, the unreduced bonding strength on the exterior surfaces, an initial value of the same is set in a way that breaking of the prismatic test specimen, based on a tension of 22 kPa, by one of the parallel plates will occur at the earliest after extending the same by 50%.

2. A joint sealing tape according to claim 1, characterized by the following composition in mass %:

35 to 36% of a premix, comprising 73 to 75% of a soft grade bitumen, 18 to 19% of rubber and 7 to 8% of comminuted tire rubber, additionally 31 to 32% of a soft grade bitumen, 19 to 20% of ground slate, 11 to 12% of cellulose powder, and 2% of silicon dioxide powder.

3. A joint sealing tape according to claim 1 or 2, characterized in that the adhesive strength of the said exterior surface is reduced by a fabric tape (3).

4. A joint sealing tape according to claim 1 or 2, characterized in that the bonding strength of the said exterior surface is reduced by a coating of a granular material, preferably sand (4).

5. A joint seal, produced by rolling-in a joint sealing tape in accordance with claim 1 or 2, characterized in that it comprises an essentially T-shaped section, with its vertical web (2.2) completely filling the joint at least in the direction of the asphalted area (1.1; 1.2), and with its horizontal web (2.1) directed towards the asphalted area gradually becoming part of this area due to its reduced thickness.

6. A method of preparing a joint sealing tape comprising preparing a premix by mixing 73 to 75%, by mass, of soft bitumen, 18 to 19%, by mass, of rubber and 7 to 8%, by mass, of comminuted tire rubber and mixing 35 to 36%, by mass, of the premix with 31 to 32%, by mass, of a soft grade bitumen, 19 to 20%, by mass, of ground slate, 11 to 12%, by mass, of cellulose powder and 2%, by mass, of silicon dioxide powder.

* * * * *